US008839457B2

(12) United States Patent
Harris et al.

(10) Patent No.: US 8,839,457 B2
(45) Date of Patent: Sep. 16, 2014

(54) IMAGE STORAGE IN ELECTRONIC DOCUMENTS (75) Inventors: Jeffrey Harris, New York, NY (US); Jonathan B. Emerson, Seattle, WA (US); Jonathan A. Wray, Santa Monica, CA (US); Nicholas M. V. Cooper, Annandale (AU); Christopher J. Nokleberg, Emeryville, CA (US)

(73) Assignee: Google Inc., Mountain View, CA (US)

( * ) Notice: Subject to any disclaimer, the term of this patent is extended or adjusted under 35 U.S.C. 154(b) by 365 days.

(21) Appl. No.: 13/085,314

(22) Filed: Apr. 12, 2011

(65) Prior Publication Data

US 2011/0277039 A1 Nov. 10, 2011

Related U.S. Application Data (60) Provisional application No. 61/323,353, filed on Apr. 12, 2010.

(51) Int. Cl.
*G06F 17/30* (2006.01)
*G06F 7/04* (2006.01)
*H04L 29/06* (2006.01)
*H04L 9/32* (2006.01)
*G06F 7/00* (2006.01)

(52) U.S. Cl.
USPC .............. 726/28; 726/4; 713/154; 713/165; 713/168; 713/170; 707/608; 707/610; 707/636; 707/694

(58) Field of Classification Search
USPC ............... 726/28, 4; 713/154, 165, 168, 170; 707/608, 610, 636, 694
See application file for complete search history.

(56) References Cited

U.S. PATENT DOCUMENTS

| 5,875,296 | A | 2/1999 | Shi et al. |
|---|---|---|---|
| 7,032,168 | B1 * | 4/2006 | Gerace et al. ................. 715/205 |
| 2002/0147929 | A1 | 10/2002 | Rose |
| 2003/0115481 | A1 | 6/2003 | Baird et al. |
| 2006/0161841 | A1 * | 7/2006 | Horiuchi et al. .............. 715/513 |
| 2008/0313703 | A1 | 12/2008 | Flaks et al. |
| 2014/0032489 | A1 * | 1/2014 | Hebbar et al. ................. 707/608 |

OTHER PUBLICATIONS

International Search Report & Written Opinion for Application No. PCT/US2011/032119, dated Jul. 15, 2011, 16 pages.
Holzner et al., "Google Docs 4 Everyone," Feb. 9, 2009. <http://www.scribd.com/doc/14119795/Google-Docs-4-Everyone>.

* cited by examiner

*Primary Examiner* — Aravind Moorthy
(74) *Attorney, Agent, or Firm* — Ropes & Gray LLP (57) ABSTRACT A computer-implemented method for controlling access to digital media involves receiving a URL at a computer server system, decoding the URL, extracting a user ID of a user who submitted the URL and an image ID of an image that is accessible by the server system, using the user ID to determine whether the user who submitted the URL is authorized to access the image, and controlling access to the image by the user based on the determination of whether the user who submitted the URL is authorized to access the image.

20 Claims, 5 Drawing Sheets

IMAGE STORAGE IN ELECTRONIC DOCUMENTS

CROSS-REFERENCE TO RELATED APPLICATIONS

This application claims priority to U.S. Provisional Application Ser. No. 61/323,353, filed on Apr. 12, 2010, entitled "Image Storage In Electronic Documents," the entire contents of which are hereby incorporated by reference.

TECHNICAL FIELD

This document relates to systems and techniques for managing images that may be displayed in an electronic document such as a spreadsheet or a word processing document.

BACKGROUND

Cloud-based, or hosted, computing generally involves executing applications via a web browser, and obtaining information for the applications from a remote server system or service. Various applications are available from hosted services, including search engines, maps services, and productivity applications such as word processor and spreadsheet programs that run by loading executing HTML and JavaScript code from the server system to a browser running on a client computing device that is remote from the server system.

Cloud computing provides real advantages over traditional desktop software, such as the ability to access documents from various different computers and locations. Web browsers do, however, place a number of limits on programs that run on them. For example, web browsers may offer programmers HTML elements that are very simple to implement but can be rather inflexible. As one example, a browser text box can be a simple way for a programmer to acquire textual input from a user of a browser, but the manner in which the text is presented is relatively bland. Also, browsers do not provide access to native text rendering capabilities, do not generally permit much flexibility in positioning images on a web page, and cannot natively execute other functions that are expected from a full-featured word processor application. Although web browsers provide very good tools for working with text, they can require more work when attempting to implement rich features such as digital images and executable files.

SUMMARY

This document describes systems and techniques that may be employed to manage access to images in documents. For example, a number of users may be accessing a document collaboratively, and that document may have several digital images inserted into it by one of the users. The techniques discussed here can be used to ensure that various users have appropriate access rights before they are shown the image.

In one implementation, a computer-implemented method for controlling access to digital media is disclosed. The method comprises receiving a URL at a computer server system, decoding the URL, extracting a user ID of a user who submitted the URL and an image ID of an image that is accessible by the server system, using the user ID to determine whether the user who submitted the URL is authorized to access the image, and controlling access to the image by the user based on the determination of whether the user who submitted the URL is authorized to access the image. The URL can be received in response to a document in which the image is embedded being loaded by a browser-based application. Also, the method can further comprise determining whether the image is stored locally to the computer server system, and providing a copy of the image from an external source to a source internal to the server system, and assigning an image ID to the image.

In another implementation, a computer-implemented method for controlling access to digital media is disclosed. The method comprises automatically identifying on a client computing device a user ID and a media ID for a piece of media that is extracted from a document being rendered on the client computing device; encoding the user ID and the media ID into a string and submitting the string to a remote server system; and receiving from the remote server system, in response to submitting the string, a piece of media identified by the media ID, if the user ID indicates that a user of the client computing device has access to the piece of media. Encoding the user ID and the media ID can be performed using a public key that corresponds to the remote server system. Also, the user ID and media ID can be encoded into a URL sent from the client computing device to the server system. Moreover, the user ID can be obtained from a cookie stored on the client computing device.

In certain aspects, the user ID and the media ID are automatically identified in response to the client computing device obtaining from the remote server system a document that contains a reference to the media item. The method can also include requesting from a user of the client computing device an authentication key, and using the authentication key to produce the user ID. Also, submitting the string can comprise submitting an HTTP request to the remote server system.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques for browser-based word processing applications. As discussed in more detail below, image access may be restricted to only authorized users by encoding an image ID and a user ID for a requesting user in a URL. The URL may be obtained by a server that controls access to the image, and may decode the URL to determine who the user is and what the image is. The user ID may be used to check whether the requesting user is still authorized to access the image, and the image ID may be used in order to find the image if the user is so authorized. The image may then be sent back to the requesting application, and may, for example, be incorporated into the display of a document being edited by the user in a hosted collaborative editing environment.

Figure 1:
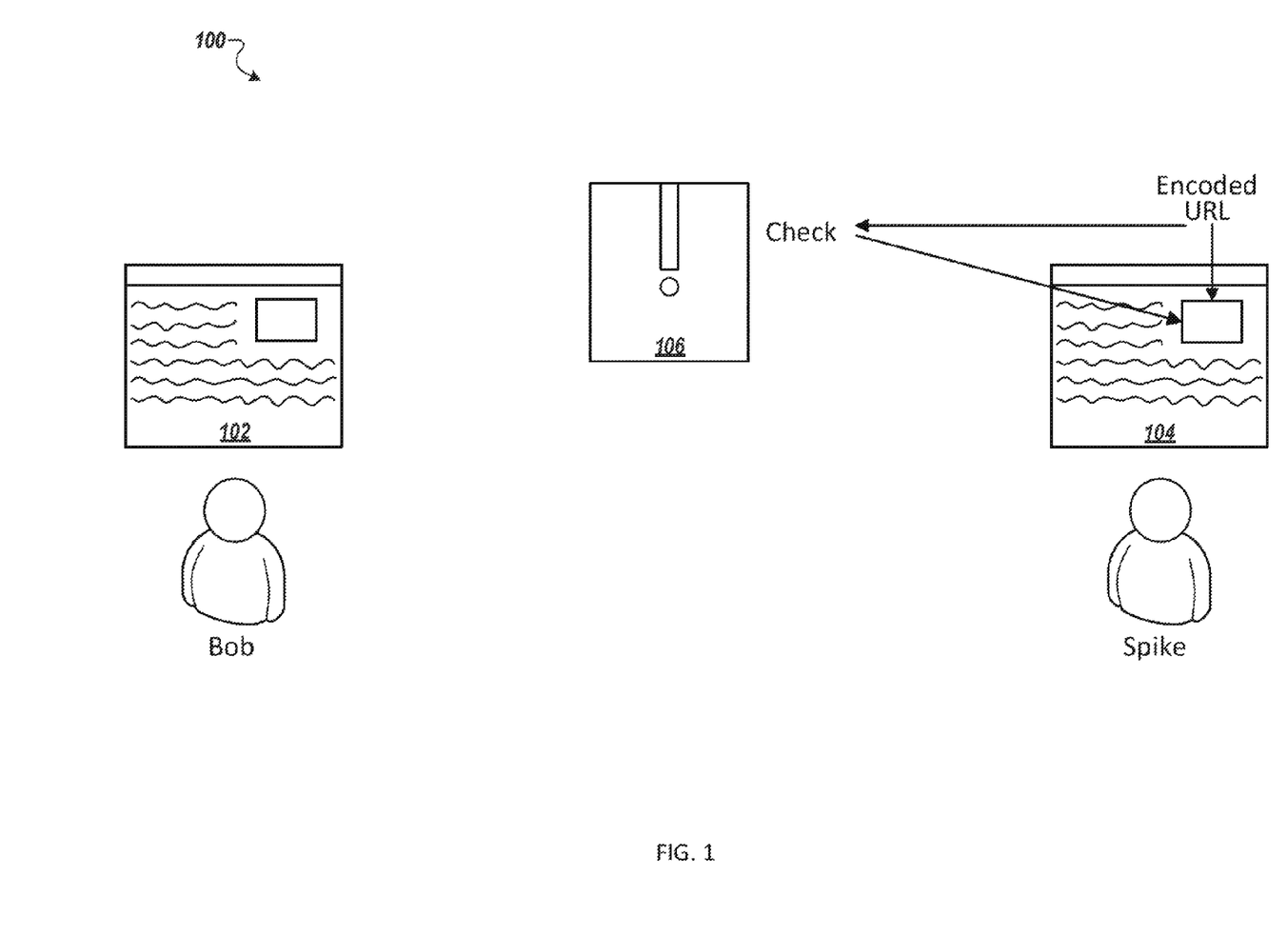
FIG. 1 is a conceptual diagram of a browser-based word processing system for collaborative editing of documents that contain images.

FIG. 1 is a conceptual diagram of a browser-based word processing system for collaborative editing of documents that contain images. In this example, a user Bob is interacting with a web page 102 displayed by a browser executing on a computing device operated by Bob. Likewise, a user Spike is viewing a web page 104. The content for the web pages may be a collaborative word processing document provided by a hosted system accessed over a network such as the internet, and the users may be allowed to review and edit the document As shown in the figure, the particular document that the users are editing includes a digital image in its upper right corner. Bob may have initially included the image in the document, though the system 100 may be established to ensure that all users who seek to see the image actually have access to see it. Thus, as shown here, when the document loads on browser 104, a URL may be created and submitted to a server system 106 that is managing the collaborative editing process, where the URL may be formed as an encoded version of an ID for the image and an ID for user Spike.

That URL may then be obtained by the server system 104, which may use a private key to decode the URL, and thereby extract the user ID and the image ID. The server system 106 may then check an access control list for the image to determine whether Spike is on the list, and if he is, the server system 106 may cause the image to be delivered to browser 104 for display.

If the image is not stored within the system 100, the server 106 may instead fetch the image and create a new internal object for the image, so that future attempts to access the image may follow the process discussed here. If an external image cannot be accessed, then the browser 104 displays the message "image inaccessible." Such an action may also occur when a new external image is first inserted into a document by a user such as Bob or Spike.

When a user adds a new image, they are presented with a grayed out block that matches the size of the image. The block warns the user that the image is being uploaded. It also gives the user the option to "Preview" the image, but makes it clear that the image is not committed until it has been uploaded. When a user is working offline, inserting an image has the same behavior. Upon upload/paste the user is told that the image is "Pending Upload". They still have the option to preview the image and move it around like normal, but it is made clear that the image is not committed to the document until after they reconnect.

Where a document has been deleted and a URL for an image in the document is submitted to the server system 106, the server system 106 may determine that the document that corresponds to the image no longer exists and may return an error.

For collaboration with image-based documents, when one user inserts an image into a document, the appropriate URL is created for that image and the notice of the added entity is sent to the server. The entity itself only needs to include a reference to the image's ID. It is up to the server to also encode the user ID in the image's URL before sending it to any clients.

We now discuss in more detail the arrangement of an example model-view-controller client set-up that can be used with a browser-based application on a client device to provide displays of on-line documents, and additional structures and other components that may be implemented in a collaborative document editing system. In particular, the model-view controller arrangement may be used when a user tries to render a document that is stored as a model, and the rendering process calls for an image to which access control has been applied. A controller or other component of the system may then encode an image ID and user ID in a URL at the client, submit the URL to a server system that manages interaction with the document, and wait to have the image or a message returned form the server system.

Figure 2A:
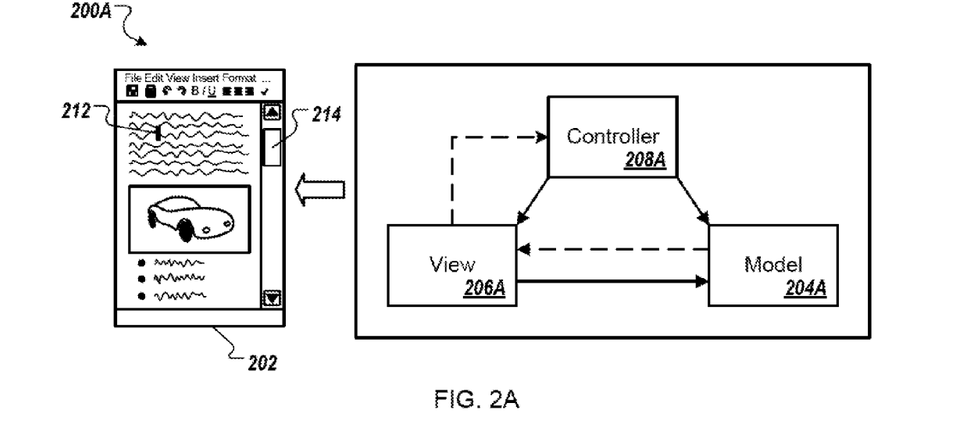
FIGS. 2A and 2B are block diagrams showing components of a model-view-controller implementation of a spreadsheet application.
Figure 2B:
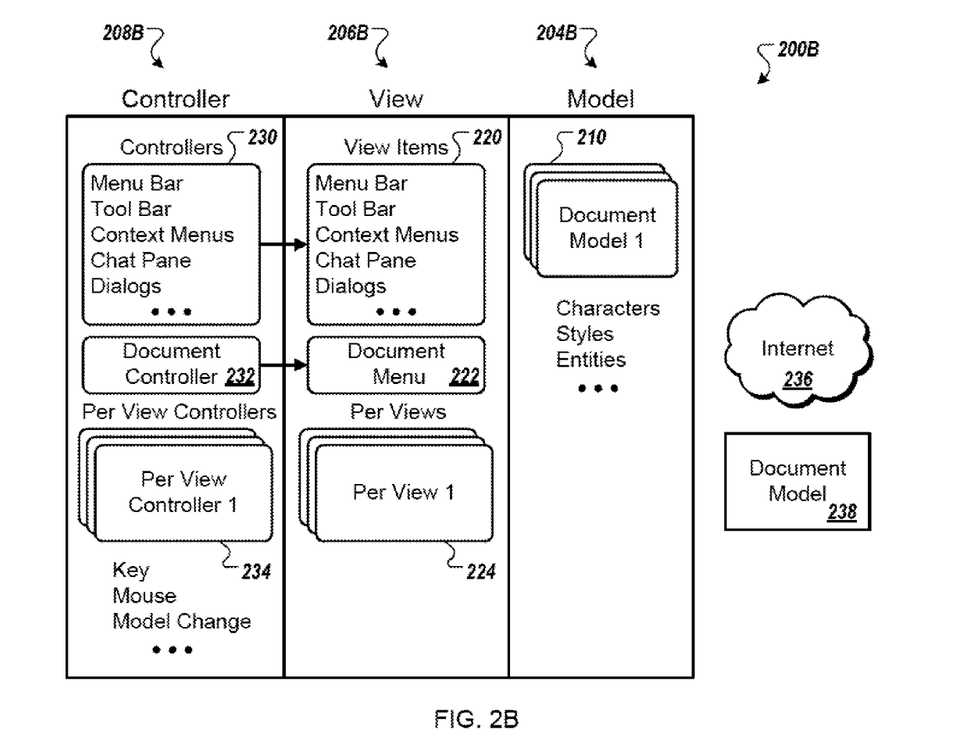

FIGS. 2A and 2B are block diagrams showing components of a model-view-controller (MVC) implementation of a word processing application. The word processing application, for example, may be executed by a web browser, such as the browser 104 shown in FIG. 1A. In general, the MVC implementation provides for the download of a model from a remote server to a client, and the rendering of the model into a DOM to form a view of the model that may be managed directly by the web browser. The controller may intercept actions, such as clicks on icons and keystrokes on a keyboard, and may cause such actions to be implemented, such as by adding typed characters both to the model on the client and on the remote server (e.g., uploading changes or mutations back to the server, which may be programmed with rules for integrating the mutations into a master model, so that the client-side model matches the master model as the user works).

Referring to FIG. 2A, a computer application 200A may be configured to display a word processing document 202. The application 200A includes, controls, or accesses a model 204A, a view 206A, and a controller 208A. For example, the model 204A can contain a representation of the state of the word processing document 202, including such elements as character data, formats, styles, paragraphs, sections, breaks, lists, tables, images, formulas, and the like. The view 206A can represent a rendering of the current state of the model 204A. For example, the view can provide a visual representation that combines the substance of the document (e.g., its raw text) with formatting and layout information. The view, when displayed by a browser, provides a form of, if not an exact, WYSIWYG representation of the document that is defied by the model.

In addition to the rendering of the model, the view 206A can be used for presenting to the user visual information that is associated with the word processing document 202, such as visible user controls for the application (i.e., chrome) and other word processing data. The controller 208A can respond to changes in the model 204A or the view 206A, and can update the state of the model 204A and the view 206A. As shown in FIG. 2A, solid lines between the model 204A, the view 206A, and the controller 208A represent direct references between components, and dashed lines represent listeners. For example, listening for user interaction (e.g., provided by user controls) with the presentation of the view 206A, the controller 208A can modify the model 204A, and can in turn modify the view 206A either directly or indirectly (by causing the view 206A to obtain new model data and render that new data).

As another example, listening for changes in the model 204A made by another user in a collaborative environment or changes made through an automated data update or another such process, the view 206A can request re-rendering of an updated model or portion of the model. For example, if a user of a client device is only one of multiple users concurrently editing a document, characters and other edits by the other users may be passed to the client device from the server system (and edits by the first user may be passed from the client device to the server system), and the client code may add characters to the model in near real-time, and those changes can be passed into the DOM (e.g., via rendering by the view 206A)—so that each user can see the edits made by the other users very quickly.

Referring to FIG. 2B, the model-view-controller implementation as presented in FIG. 2A is shown with additional detail. As shown, a computer application 200B (corresponding with the application 200A) includes, controls, or accesses a model 204B (corresponding with the model 204A), a view 206B (corresponding with the view 206A), and a controller 208B (corresponding with the controller 208A).

The model 204B can include one or more document models 210. Each of the document models 210 can represent a separate document in a collection of word processing documents, for example, and each of the models 210 can include elements such as characters, styles, and entities. Other forms of documents such as spreadsheet documents may also be represented. Model data and elements may be provided by a master document model 238 that is stored on a remote server system via a connection to a network 236 (e.g., the internet).

Generally, document text in the models 210 is associated with a series of characters. For example, the characters may represent raw text for the word processing document 202, and may also include certain reserved control characters such as characters that indicate the occurrence of a break (e.g., a paragraph break, a page break, or the like). In some implementations, each of the document models 210 can include a one-dimensional character string that includes document characters in an order in which they appear in the document.

Styles may be used to store information related to the presentation of document text (e.g., the series of characters). For example, text styles may include character formatting attributes such as font, font size, bold, italics, underline, foreground and background colors, alignment, and other such attributes. In some implementations, styles included in each of the document models 210 can be stored in a sparse map. For example, the sparse map can include markers that correspond to changes in styles in the document and pointers to positions in the character string. The pointers, for example, can define style runs between matched markers by specifying locations along the character string at which style changes occur. In some implementations, the markers in the matched set may be arranged to be tethered to certain characters in the one-dimensional character string. For example, if text is added between two paired markers, the pointer for one of the markers may shift by an integer equal to a number or characters associated with the added text.

Entities in each of the models 210 may be used to store information related to objects outside of the document models 210, and may be pointed to by references in the model such as in the one-dimensional character string. For example, entities may include objects such as lists, tables, images, and the like. In some implementations, the references can include object identifiers and pointers to the one-dimensional character string (e.g., from the sparse map) indicating where in the character string the object should appear, or identifiers from within the character string that point to the entities and mark the locations at which the particular entities are to appear in the document when it is rendered and displayed. For example, an image that should appear between two paragraphs may be associated with a special character appearing in the character string after a paragraph marker for one paragraph, and before the first character of the next paragraph.

The view 206B can generate one or more view items 220 that may enable the user to interact with the application 200B, such as menu bars, tool bars, context menus, chat panes, dialogs, other chrome, and the like. The view 206B can also include a document menu 222 that presents information and control options related to one or more of the document models 210, and one or more of a set of per views 224. For example, one of the per views 224 may be associated with a corresponding one of the sheet models 210. Each of the per views 224 may include components or controls such as selectors (e.g., cursors, selection indicators, and the like) navigation tools (e.g., scrollbars, document maps, outlines, and the like).

The controller 208B can include one or more controllers 230 that may listen for and handle user interactions with one or more of the view items 220. In some implementations, each of the controllers 230 may be associated with a corresponding one of the view items 220. For example, menu bar controllers may listen for and handle user interactions with menu bar view items (e.g., relating to various actions that a user would typically take from a row of menu selections), tool bar controllers may listen for and handle user interactions with tool bar view items, context menu controllers may listen for and handle user interactions with context menu view items, and so forth. The determination that a particular event has occurred may cause a particular controller 230 to execute predetermined code or otherwise carry out a predetermined process, such as by updating a local model when a key press is received and uploading information about the key press to a central server system.

The controller 208B can also include a document controller 232 that may listen for and handle user interactions with the document menu 222. In addition, the controller 208B can include a set of per view controllers 234, where each of the controllers 234 is configured to listen for and handle user interactions with a corresponding view in the set of per views 224. Each of the per view controllers 234 may include various controller types, such as key controllers for intercepting and interpreting keyboard input, mouse controllers for intercepting and interpreting mouse input, and model change controllers for intercepting and interpreting model change events.

Generally, the controllers included in the controller 208B can transform user-generated events into model and view mutations. For example, based on a user action, a relevant controller (e.g., a controller configured for handling the action) may receive one or more events associated with the action and make transient changes to the view 206B before the user action is committed. Then, based on the event properties, the relevant controller can construct a command to mutate the model 204B, execute it, and send the updated model or just data for the particular mutations to the remote server system that hosts the document model 238 via the network 236.

The controllers may also use timers or other mechanisms to aggregate inputs or mutations, so as to lower the number of updates that need to be made to the local or server-based models. For example, the controllers may implement changes to the local and/or server-based model in batches that occur within predefined time windows, such as by waiting 200 ms after an initial keystroke is sensed before sending to the central server system data about all keystrokes received in the time window.

Many possible user interactions with the application 200B are possible, including interactions that are included in single-user sessions and in multiple-user sessions. For purposes of illustration, a series of example user interactions with the application 200B are described here. For example, to enter text into the word processing document 202, the user may proceed by using a computer mouse to select a desired document location 212 for text insertion by clicking on the document 202. A mouse controller that is included in the per view controllers 234 (e.g., a per view controller associated with the active document 202) can listen for an event that is associated with the mouse positioning input and the mouse click input, and upon intercepting it, can modify the view 206B (e.g., a per view associated with the active document) to provide the user with a visual indicator for the selection (e.g., a cursor). For example, the selected location 212 may be associated with a visible cursor (where the cursor is a graphical HTML element such as an image, and is displayed at an appropriate location on a canvas where the document is also being displayed so as to create a synthetic presentation that makes the graphical element look like a true cursor), may be highlighted, or may receive another such modification. Additionally, the selected location 212 may also be associated with a location in the model 204B. For example, a position in a one-dimensional character string included in the document models 210 can be determined, based on the selected location 212.

Using a keyboard, the user may enter desired text at the document location 212. A keyboard controller that is included in the per view controllers 234 can listen for events associated with the keyboard input, and upon intercepting them, can modify the view 206B to provide the user with a visual indicator for the input. For example, as the user types text at the location 212, the document 202 may be visually updated to present the text to the user. Additionally, the keyboard controller can modify the model 204B to include entered text by copying the user input to the model. For example, a one-dimensional character string included in the document models 210 can be updated to include the entered characters. Additionally, the document model 238 may be updated to include the entered text, thus coordinating the model 204B with the document model 238. For example, changes to the model 204B may be transmitted to the document model 238 via a connection to the network 236. In some implementations, changes may be sent periodically (e.g., once every 100 milliseconds, once every 200 milliseconds, once every 500 milliseconds, once every second, once every 2 seconds, or another appropriate time interval). In some implementations, changes may be sent based on user activity (e.g., entering a paragraph break, applying a formatting change, navigating to another document section, clicking a save button, or some other action).

As another example, the user may insert an entity (e.g., a list, a table, a hyperlink, an image, or another such object) into the document 202. For example, the user may proceed by using a computer mouse to select a desired document location (e.g., the location 212) for entity insertion by clicking on the document 202. Similar to interactions associated with text entry, for example, a mouse controller included in the per view controllers 234 can listen for an event associated with the mouse positioning input and the mouse click input, and upon intercepting it, can modify view 206B to provide the user with a visual indicator for the selected location. Next, for example, the user may specify the entity for insertion by interacting with one of the view items 220 or with the document menu 222. For example, the user may make a selection on a menu bar to indicate an intent to insert an image. A dialog associated with image selection may be presented to the user, enabling the user to select the desired image.

Model-view-controller interactions for adding the entity within the application 200B may operate in a similar manner as when a user is entering text. For example, as the user inserts the image at the location 212, the document 202, as it is displayed on an editing surface, may be visually updated to present the image to the user. Additionally, the model 204B may be modified to include a reference to the inserted image by writing the reference to the model. For example, one of the document models 210 (e.g., the model associated with the active document) can be updated to include a reference to the inserted image. A one-dimensional character string may be updated to include a special character indicating the position of the image, and the reference to the image may be stored.

When the document 202 is rendered from the model associated with the active document, for example, the image content may be integrated into the document 202 that is displayed to the user. In some implementations, the one-dimensional character string may include multiple instances of an identifier for a single entity. For example, the image may be positioned at multiple locations in the document 202, specified by multiple positions for the identifier in the one-dimensional character string. Thus, a single external entity may be shared within a document, or may be shared among multiple documents—both by common references to the external entity. The document model 238 may be updated to include the inserted image(s), thus coordinating the model 204B with the document model 238. For example, changes to the model 204B may be transmitted to the document model 238 via a connection to the network 236.

Additionally, for example, the user may modify the formatting of text and entities presented in the document 202. By interacting with one of the view items 220 or with the document menu 222, the user can indicate a desired formatting change (e.g., a change such as changing a font of a selected text block to bold, changing a group of words to be organized as a list, changing a paragraph justification to be right-aligned, changing a document line spacing to be double-spaced, and the like). One of the controllers 230 or the document controller 232 can listen for user interaction with the view 206B, and upon detecting the interaction, can modify the model 204B to include the formatting change. For example, one of the document models 210 (e.g., the model associated with the active document) can be updated to include an element in a sparse map of styles defining the formatting change, and defining the locations along the one-dimensional character string at which the changes in style are to occur. A model change controller included in the per view controllers 234 can listen for events associated with the model 204B and can send a request to the view 206B to update accordingly (e.g., by rendering a display of formatted text). In some implementations, the model change controller may also handle model change events that result from collaborative model changes.

In some implementations, a document model that is one of the document models 210 may include a subset of the document data from the document model 238. For example, if the document model 238 is substantially large, a subset of the data (e.g., a subset associated with a portion of the document that is currently viewable by the user, plus perhaps a buffer area around the currently viewable area, or viewport, so that small scrolling distances may be handled by normal browser interactions without a need to render additional content form the model) may be provided to each client that is currently displaying the word processing document 202. As another example, the full document model 238 may be provided to each client.

The user may elect to view a different portion of the word processing document 202 than the user is currently viewing in the web browser. For example, by interacting with a scrollbar 214 that is associated with the document 202, the user may indicate an intent to view document data beyond the current viewport, or displayed area. One of the per view controllers 234 (e.g., the per view controller associated with the active document) can listen for user interaction with the view 206B or other appropriate component (e.g., the visual portion of the scrollbar 214), and upon detecting the interaction (e.g., via a computer mouse), can request for the view 206B to redraw itself.

If the user specifies a small amount of scrolling, the view 206A may cause itself to be displayed by the browser. For example, a buffer area of document data may be maintained in the model 204B (already rendered into a DOM) around the data that is displayed in the visible area of the document 202. If the amount of scrolling specified by the user is determined by the view 206B to be within the bounds of the buffer area of data, the document display may be updated using such pre-rendered data. If the user specifies a larger amount of scrolling, such that the scrolling specified by the user is determined by the view 206B to be outside of the bounds of the pre-rendered buffer data, for example, additional document data from the document model 238 may be downloaded via the network 236. Thus, the model 204B may be updated with information that is related to additional document sections, and the document may be rendered using the downloaded data.

Figure 2C:
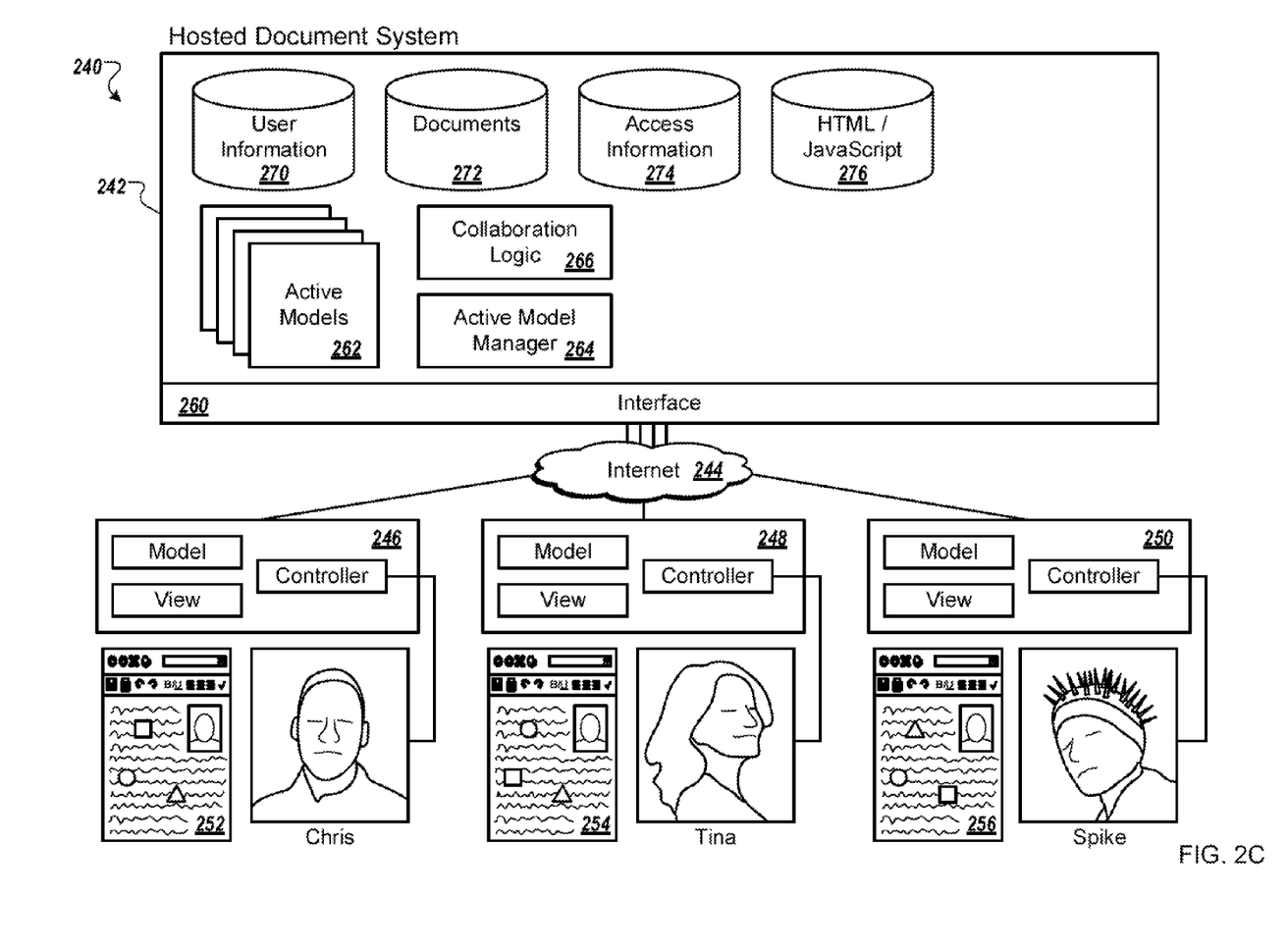
FIG. 2C is a block diagram of a system for permitting collaborative editing of a documented by multiple users through a hosted server system.

FIG. 2C is a block diagram of a system 240 for permitting collaborative editing of a document by multiple users through a hosted server system. In general, the system 240 includes a hosted document system 242 executed by one or more computer servers (e.g. a server farm). The hosted document system 242 can provide document hosting services to any number of client users via connections to a network 244 (e.g., the internet). Using the document system 242, client users may create new documents, modify existing documents, share documents, and collaboratively work on documents with other users.

For purposes of illustration, document hosting services may be provided to browser applications 246, 248, and 250. Each of the applications may be executed by a web browser (e.g., by the browser 104, as shown in FIG. 1), and may include model, view, and controller components (e.g., similar to the application 200, shown in FIGS. 2A and 2B). The applications 246, 248, and 250 may be configured to execute computer code (e.g., JavaScript and other code running in a web browser) to display a word processing interface and to perform word processing functions associated with one or more documents served by the hosted document system 242.

As shown in the present illustration, Chris can interact with a web browser 252, Tina can interact with a web browser 254, and Spike can interact with a web browser 256. Each of the browsers 252, 254, and 256 may access any appropriate number of browser applications (e.g., embedded applications, widgets, web services, and the like). For example, browser 252 can access application 246, browser 254 can access application 248, and browser 256 can access application 250.

By interacting with controls presented by the web browsers, for example, users of the system 240 (e.g., Chris, Spike, and Tina), can work with one or more documents that are managed and provided by the hosted document system 242. For example, the users may access existing documents provided by the system 242 or may create new documents. Each of the browser applications 246, 248, and 250 can communicate with an interface 260 of the document system 242 via the network 244. For example, communication between the browser applications 246, 248, and 250 and the interface 260 may include HTTP (HyperText Transfer Protocol) requests, SOAP (Simple Object Access Protocol) messages, or some other appropriate such protocol. In some implementations, client browsers may maintain browser channel connections to the interface 260 for communicating session data between clients and the document system 242.

The hosted document system 242 can include sub-components for storing and managing information related to system users, documents, and browser applications. The various sub-components may be executed by the same computer server, or may be distributed among multiple computer servers. The sub-components may communicate with each other directly (e.g., via messages, transferred files, shared data, remote procedure calls, or some other protocol) or indirectly (e.g., by communicating with an intermediary application). Generally, sub-components included in the document system 242 can communicate with client applications (e.g., the browser applications 246, 248, and 250) via the interface 260.

The system 242 can also include one or more data stores for storing user information 270. For example, the user information 270 can include information associated with system users (e.g., Chris, Tina, and Spike). Such information may include general user information and login information (e.g., user names, passwords, e-mail addresses, and the like), information related to one or more devices employed by the users to access the system (e.g., IP addresses, browser versions, connection speeds, and the like), and system usage information (e.g., access times, amount of data accessed, and the like), to name a few possibilities.

In some implementations, the system 242 can include one or more data stores for storing documents 272 in the form, e.g., of document models like those discussed above and below. For example, the documents 272 can include word processing documents created, maintained, and accessed by system users. As another example, the documents 272 may be generated by an automated process, such as a news feed or another reporting process that is based on gathered data. Information associated with the documents 272 can include document data models, document text, document formatting information, entities (e.g., tables, images, videos, sound clips, or other such objects), and the like.

The system 242 can also include one or more data stores for storing access information 274. For example, the access information 274 can include information that can be used for controlling access of system users (e.g., users included in the user information 270) to system documents (e.g., documents included in the documents 272). Generally, system users may set access privileges for documents that they create or manage. For example, Chris may create a personal letter document and specify the document as being private. Thus, other users of the system (e.g., Tina and Spike) may be unable to locate or access the document, which may have access control limitations applied to it in various familiar manners. As another example, Tina may upload a schedule document and specify the document as being shared and as being viewable by Chris. Thus, Spike may be unable to locate or access the document, but Chris may be able to access the document in view-only mode. In some implementations, Tina, as the document creator, may retain full access to the document, having privileges such as the ability to add, edit, and delete content, having the ability to change privileges, and having the ability to remove the document from the system 242. As another example, Spike may create a document related to a group project and specify Chris and Tina (and himself) as having full access privileges. In some implementations, user groups may be included in the access information 274. For example, a user may create a group and may add one or more users to the group. Rather than select individual users when assigning document permissions, in some instances, users may select a group including the users. The access information 274 may also include such information as the user ids of document users, document access times, and the like.

In some implementations, the system 242 can include one or more data stores for storing HTML/JavaScript 276. For example, the HTML/JavaScript 276 can include application code for executing the browser applications 246, 248, and 250. The application code may be provided to any of the browsers 252, 254, and 256, for example, when browser users access a web site associated with the hosted document system 242. Upon receiving a request for any of the documents 272, for example, the system 242 may provide the HTML/JavaScript 276 in addition to one or more of the documents 272. Using the HTML/JavaScript 276, the browser applications 246, 248, and 250 may render the document data and may provide an interface that enables browser users to interact with the documents. In some implementations, technologies other than HTML and JavaScript may be used for providing application code. For example, for web browsers including an appropriate plugin, another type of compiled or interpreted code may be provided.

Many possible user interactions with the system 240 are possible, including interactions in single user sessions and in multiple user sessions. For example, in a collaborative editing session, multiple users may simultaneously interact with a document. Although the applications used for editing the document may each behave independently, the applications may follow the same editing rules for updating and rendering the document model. Thus, multiple users may have similar experiences with the document, and may work together to produce a similar document model.

In an example session, to initiate collaborative word processing document editing, Chris accesses the hosted document system 242 by directing the web browser 252 to a web site (e.g., a domain) that is associated with the system 242. Receiving login information from the browser 252, the system 242 can verify Chris's information against the user information 270. Upon verification, the system 242 can provide HTML/JavaScript 276 to the browser 252 for executing an online word processor (though certain of the code may be passed before verification occurs). The browser can include a portion of the HTML/JavaScript 276 as the browser application 246, render chrome associated with the application, and display the application to Chris.

Chris may interact with the browser application 246 via a set of controls displayed in an application view within the browser 252. For example, Chris may indicate an intent to create a new document by clicking a button or selecting a menu option displayed in the application view. The application controller can intercept the command and pass the command to the interface 260 via the network 244. Receiving the command, the system 242 can add a new document to the documents 272, and add information associated with the new document to the set of active models 262. For example, the active models 262 may include model information associated with documents currently being edited by other users of the system 242.

A corresponding version of a model in the set of active models 262 may be present at the browser application 246. For example, Chris may add content and make changes to the word processing document provided by the view of the browser application 246, and the corresponding content and changes can be applied to a model that is accessed by the browser application 246 (and associated HTML and JavaScript code running in the browser), and may be propagated to the active models 262.

Chris may also share the document with one or more users. For example, using controls associated with the application 246, Chris may select Tina and Spike as users who may share the document, and he may assign both Tina and Spike full document privileges. For example, Tina and Spike may be included in a presented list of users commonly sharing documents with Chris, and Chris may select Tina and Spike from the list. As another example, Chris may provide the e-mail addresses of Tina and Spike. The system 242 can store the sharing information (e.g., user ids of other users having access to the document, permissions levels for the users, and the like) in the access information 274. In some implementations, the system 242 may send messages (e.g., e-mail, text messages, instant messages, and the like) to users who have received document privileges. In some implementations, users who have received document privileges may receive a link (e.g., a hyperlink or URL) to the shared document.

Upon receiving notification of the shared document, Tina and Spike may access the document using their web browsers 254, 256. For example, upon verification, the system 242 can provide HTML/JavaScript 276 to the browser 254, 256 for executing an online word processor. The browsers can include a portion of the HTML/JavaScript 276 as the browser applications 248, 250, can render chrome associated with the application, and can display the applications.

Additionally, an active model manager 264 included the hosted document system 242 can identify which documents are currently open by users of the system, and users who are active in the document (i.e., Chris), and can set up a collaborative session. For example, the active model manager 264 can determine that the document requested by Tina and by Spike is associated with one or more of the active models 262. The system 242 can then forward the document request to a computer hosting the document, and the computer can associate Tina and Spike with the current session. Additionally, the browser applications 248, 250 can download model data associated with the active model(s) 262, and render and display the downloaded model data. In some implementations, the system 242 can create model instances for Tina and for Spike and can add the instances to the active models 262.

In the present example, users may be able to view their own cursors as well as the cursors of other users in a collaborative session. For purposes of illustration, each user's cursor appears to himself/herself as a square. For example, Chris may view his own cursor as a square, and the other users' cursors as a circle or as a triangle. Correspondingly, Tina and Spike may also view their own cursor as a square, and the other users' cursors as circles or triangles. In some implementations, the cursors may appear as a different color (which could not be shown here). For example, cursors may generally appear as underlines or vertical bars, where the cursors are different colors for each user.

In the present example, changes made by each of the users can be sent by the browser applications 246, 248, and 250 to the hosted document system 242, coordinated, and sent back to the other users. In some implementations, the changes can be sent at time intervals (e.g., once every 100 milliseconds, once every 200 milliseconds, once every 500 milliseconds, once every second, once every 2 seconds, or another appropriate time interval). In some implementations, sending can be based at least in part on user activity or inactivity. For example, during periods of user inactivity, changes may be sent or received less frequently than during periods of user activity. When a user is entering data or when a local user hovers over a cursor for another user, a pop-up label that identifies the other user may be displayed, so that the local user can identify who is making changes—though the label may then disappear so that it does not continue to block the document.

To coordinate multiple document changes made by multiple users, for example, the hosted document system 242 can include collaboration logic 266. For example, the collaboration logic 266 can be executed by one or more code modules executed by one or more computer servers associated with the system 242. In some implementations, portions of the collaboration logic can be executed by the browser applications 246, 248, and 250. Generally, the logic 266 can resolve data collisions (e.g., instances where multiple users edit the same document portion or apply conflicting document formats) by applying a consistent set of rules to all user changes. Although, in some instances, one or more users may be prompted to disambiguate a change. For example, if Tina makes a document change and Spike makes a conflicting document change before receiving Tina's change, Spike may be presented with a message from the browser application 250 including possible conflict resolution scenarios. In some implementations, one user may be identified as trumping other users in collision situations. Chris, as the document creator, for example, may be able to apply his changes over changes made by either Tina or Spike in cases of conflict. For example, if Spike edits a passage at the same time as Chris deletes it, the passage (including Spike's edits) may be deleted.

Figure 3:
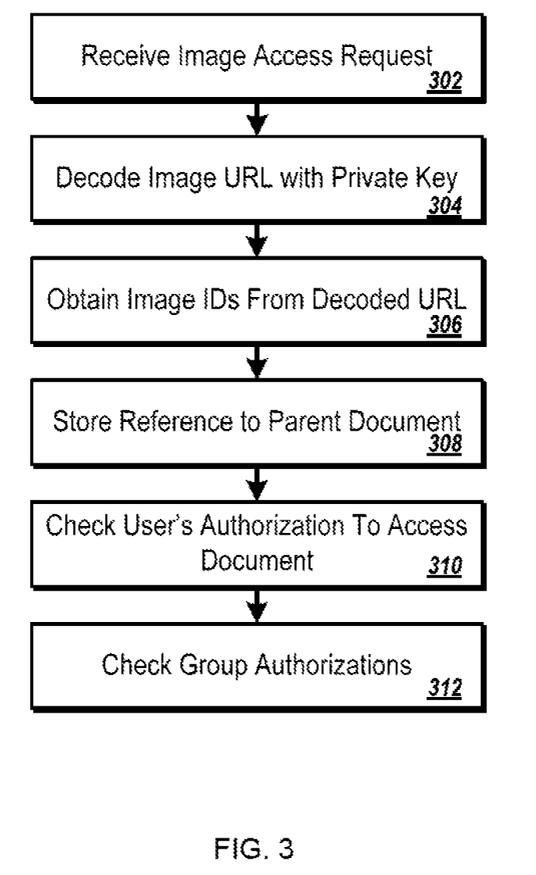
FIG. 3 is a flow chart of an example process for accessing a controlled-access digital image.

Thus, the system shown in FIG. 2C may handle collaborative editing of a hosted document by multiple users at one time. The management of such editing can involve a low amount of data passing between the various sub-systems in the system FIG. 3 is a flow chart of an example process for accessing a controlled-access digital image. The process begins at box 302, where a system receives a request to access an image stored on the system. Such a request may come directly from a registered user of the system, or may come indirectly, such as by the user loading a document that includes a reference to the image so that the image will appear to be visually embedded in the document. The images in this example may be served off a cookieless domain.

At box 304, the system decodes a URL assigned to the image using a private key, and retrieves a user ID and an image ID that were encoded in the URL (box 306). A reference to the parent document may have been previously stored, and may be identified at this step. The process may then use the extracted user ID to determine whether the particular user is still authorized to view the referenced document or image (box 310). If they are not directly authorized (e.g., are not listed on the access control list for the document or image), the process may check any groups that might be listed on the ACL so as to determine whether the particular user is a member of one of the groups. If they are authorized, then a storage system for images or other such items may serve the image that is referenced by the extracted image ID.

Figure 4:
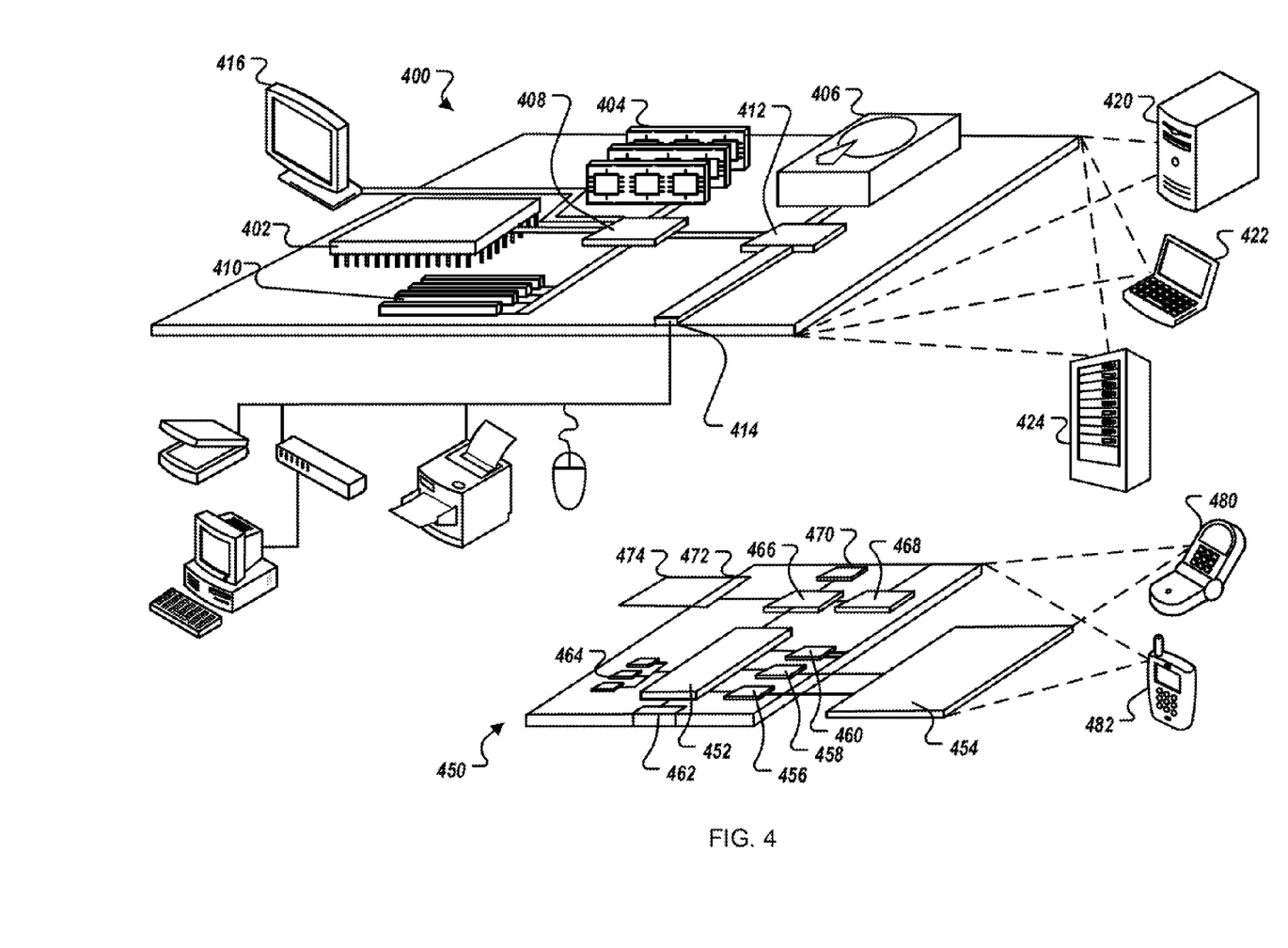
FIG. 4 shows an example of a computer device and a mobile computer device that can be used to implement the techniques described here.

FIG. 4 shows an example of a generic computer device 400 and a generic mobile computer device 450, which may be used with the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, memory on processor 402, or a propagated signal.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, memory on processor 452, or a propagated signal that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to particular types of documents and particular operations that can be performed on the documents, but other types of documents and operations may be used.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method for controlling access to digital media, the method comprising:
    accessing, at a computer server system, an image provided by a first user of a browser-based collaborative document editing application at a first remote computing device;
    receiving a URL at the computer server system from the browser-based collaborative document editing application at a second remote computing device;
    decoding at least a portion of the URL with the computer server system;
    extracting a user ID of a second user associated with the second remote computing device and an image ID of the image;
    using the user ID, with the computer server system, to determine whether the second user is authorized to access the image;
    controlling access to the image based on the determination of whether the second user is authorized to access the image; and
    displaying, if the second user is authorized to view the image, the image associated with the image ID in a document rendered in the browser-based collaborative document editing application at the second remote computing device, wherein the displayed image appears embedded in the document.

2. The computer-implemented method of claim 1, wherein the URL is received in response to a document in which the image is embedded being loaded by the browser-based collaborative document editing application.

3. The computer-implemented method of claim 1, further comprising:
    determining whether the image is stored locally to the computer server system,
    receiving, if the image is not stored locally, a copy of the image from an external source to a source internal to the computer server system, and
    assigning an image ID to the image.

4. The computer-implemented method of claim 1, wherein controlling access to the image by the second user comprises fetching the image with the computer server system and forwarding the image to the second remote computing device if the user ID is indicated as having access to the image.

5. The computer-implemented method of claim 1, wherein using the user ID to determine whether the second user is authorized to access the image comprises comparing the user ID to an access control list that corresponds to the image.

6. The computer-implemented method of claim 1, wherein decoding the URL with the computer server system comprises applying a private key for the computer server system to a portion of the URL.

7. A computer-implemented method for controlling access to digital media, the method comprising:
    automatically identifying on a client computing device a user ID of a first user associated with the client computing device and a media ID for a media item associated with a document being rendered in a browser-based collaborative document editing application on the client computing device, wherein the media item is associated with a second user associated with the document;
    encoding the user ID and the media ID into a string and submitting the string to a remote server system;
    receiving from the remote server system, in response to submitting the string, a media item identified by the media ID, if the user ID indicates that the first user of the client computing device has access to the media item; and
    displaying the media item in a document rendered in the browser-based collaborative document editing application, wherein the displayed media item appears embedded in the document.

8. The computer-implemented method of claim 7, wherein encoding the user ID and the media ID is performed using a public key that corresponds to the remote server system.

9. The computer-implemented method of claim 7, wherein the user ID and media ID are encoded into a URL sent from the client computing device to the remote server system.

10. The computer-implemented method of claim 9, wherein the user ID is obtained from a cookie stored on the client computing device.

11. The computer-implemented method of claim 7, wherein the user ID and the media ID are automatically identified in response to the client computing device obtaining from the remote server system the document that contains a reference to the media item.

12. The computer-implemented method of claim 7, further comprising requesting from the first user of the browser-based collaborative document editing application on the client computing device an authentication key, and using the authentication key to produce the user ID.

13. The computer-implemented method of claim 7, wherein submitting the string comprises submitting an HTTP request to the remote server system.

14. One or more tangible computer-readable storage media having encoded thereon instructions that, when executed by a computer, perform operations comprising:
    automatically identifying on a client computing device a user ID of a first user associated with the client computing device and a media ID for a media item associated with a document rendered in a browser-based collaborative document editing application on the client computing device, wherein the media item is associated with a second user associated with the document;
    encoding the user ID and the media ID into a string and submitting the string to a remote server system;
    receiving from the remote server system, in response to submitting the string, a media item identified by the media ID, if the user ID indicates that the first user of the client computing device has access to the media item; and displaying the media item in the document rendered in the browser-based collaborative document editing application, wherein the displayed media item appears embedded in the document.

15. The tangible computer-readable storage media of claim 14, wherein encoding the user ID and the media ID is performed using a public key that corresponds to the remote server system.

16. The tangible computer-readable storage media of claim 14, wherein the user ID and the media ID are encoded into a URL sent from the client computing device to the server system.

17. The tangible computer-readable storage media of claim 14, wherein the user ID is obtained from a cookie stored on the client computing device.

18. The tangible computer-readable storage media of claim 14, wherein the user ID and the media ID are automatically identified in response to the client computing device obtaining from the remote server system a document that contains a reference to the media item.

19. The tangible computer-readable storage media of claim 14, wherein the operations further comprise requesting from the first user of the browser-based collaborative document editing application on the client computing device an authentication key, and using the authentication key to produce the user ID.

20. The tangible computer-readable storage media of claim 14, wherein submitting the string comprises submitting an HTTP request to the remote server system.

* * * * *